United States Patent [19]

Rauch

[11] 4,366,573
[45] Dec. 28, 1982

[54] METHOD FOR SYNCHRONIZING CODE MACHINES WHICH ARE OPERATED WITHIN THE FRAMEWORK OF A BLOCK TRANSMISSION NETWORK

[75] Inventor: Walter Rauch, Neuried, Fed. Rep. of Germany

[73] Assignee: Siemens Aktiengesellschaft, Berlin & Munich, Fed. Rep. of Germany

[21] Appl. No.: 180,328

[22] Filed: Aug. 22, 1980

[30] Foreign Application Priority Data

Sep. 27, 1979 [DE] Fed. Rep. of Germany ....... 2939159

[51] Int. Cl.³ .............................................. H04L 7/00
[52] U.S. Cl. .................................. 375/106; 375/109; 371/42; 370/106
[58] Field of Search ............... 375/106, 107, 109, 114, 375/116; 371/32–34, 37, 42; 370/103, 105, 106

[56] References Cited

U.S. PATENT DOCUMENTS 3,456,239 7/1969 Glasson ................................. 371/32
3,995,111 11/1976 Tsuji ..................................... 375/109
4,110,558 8/1978 Kageyama .......................... 375/114
4,168,469 9/1979 Parikh ................................. 375/114

Primary Examiner—Benedict V. Safourek
Assistant Examiner—Stephen Chin
Attorney, Agent, or Firm—Hill, Van Santen, Steadman, Chiara & Simpson

[57] ABSTRACT

A method for synchronizing code machines, operated within a block network, provides that a connection completion block be transmitted and a connection confirmation block be received and stored by a code machine, after which the code machines are phased in. The transmitting code machine then causes transmission of the connection confirmation block to its own data terminal equipment. After transmission of the last data block, a connection release block is recognized by the code machine and the machines are phased out.

4 Claims, 5 Drawing Figures

METHOD FOR SYNCHRONIZING CODE MACHINES WHICH ARE OPERATED WITHIN THE FRAMEWORK OF A BLOCK TRANSMISSION NETWORK

BACKGROUND OF THE INVENTION

1. Field of the Invention

The invention relates to a method for synchronizing code machines which are operated within the framework of a block network, according to which, for completing a connection between first and second data terminal equipment, a connection completion block is transmitted from the first data terminal equipment to the second data terminal equipment, whereupon the second data terminal equipment transmits a connection confirmation block, subsequent to which the data terminal equipment transmit data blocks to one another.

2. Description of the Prior Art

According to a system developed by the assignee, a connection completion is initiated for the synchronization of code machines by the transmission of a connection completion block and of a connection confirmation block. One of the data and equipment then transmits a first data block which is provided with a heading. The assigned code machine emits a first code machine block consisting of the heading, a preamble and the encoded data. On the basis of all further data blocks, further code machine blocks are transmitted with a respective heading, with a respective preamble and with the encoded data. After the last data block, a connection release block is transmitted to the assigned code machine which occasions the transmission of a further heading and of a further preamble. Moreover, the code machine occasions the transmission of a connection release block.

According to the above-discussed art, the code machine on the transmitting side is newly phased-in and subsequently phased-out after each receipt of a data block. The code machine at the receiving side is newly phased-in before reception of each code machine block and is subsequently phased-out after decoding. The greater the plurality of code machine blocks to be transmitted, all the more negative effect have the transmitted preambles, because the time which is available for the transmission of a plurality of code machine blocks is limited.

SUMMARY OF THE INVENTION

The object of the present invention is to provide a method for synchronizing code machines in which the time required for phasing-in of the code machines is independent of the plurality of code machine blocks to be transmitted.

The above object is realized, according to the present invention, by the following steps:

A. The connection confirmation block is stored in the area of the first code machine of the first data terminal equipment;

B. After receipt of the connection confirmation block, the first code machine causes the transmission of a code machine synchronization block with the assistance of which the code computers of the data terminal equipment are synchronized; and C. After synchronization of the code computers, the first code machine causes the relaying of the connection completion block to the first data terminal equipment.

In practicing the present invention, the time required for the phasing-in of the code machines is independent of the plurality of data blocks to be transmitted because the phasing-in, after completion of the connection, is only undertaken a single time.

In order to initiate the phasing-in operation from one of the two code machines, it is advantageous that the first code machine send a first code machine synchronization block to the second code machine of the second data terminal equipment and, therefore, effect the synchronization of the transmission portion of the first code machine with the reception of the second code machine; and that the second code machine of the second data terminal equipment transmits a second code machine synchronization block to the first code machine and, therefore, effect the synchronization of the transmission part of the second code machine with the receiving part of the first code machine.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
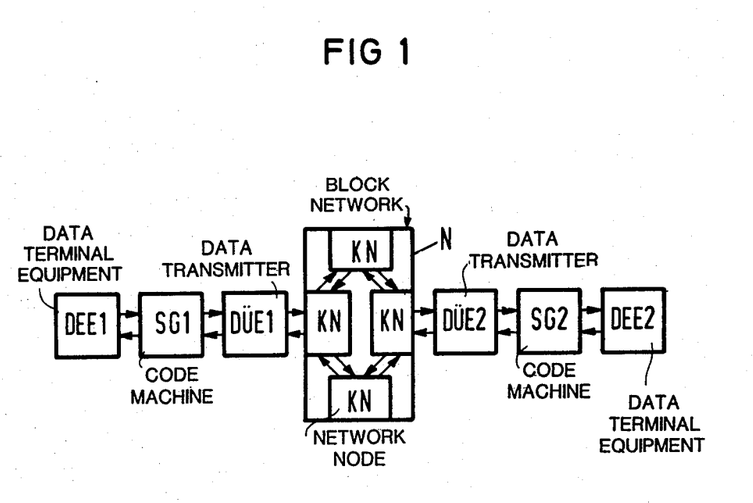
FIG. 1 is a block diagram of a data transmission system.

FIG. 1 is a block diagram of a data transmission system for the transmission of encoded data. It can be a matter of a full duplex system or a half-duplex system. The data terminal equipment DEE1 transmits uncoded data to a code machine SG1. The data encoded are provided to a data transmission means DUE1 and from there to a block network N which contains a plurality of network nodes KN. The encoded data are transmitted within the block network from one node to another node and arrive at a code machine SG2 by way of a data transmission means DUE2. In ithe code machine SG2 the data are decoded and the decoded data are fed to a data terminal equipment DEE2.

Figure 2:
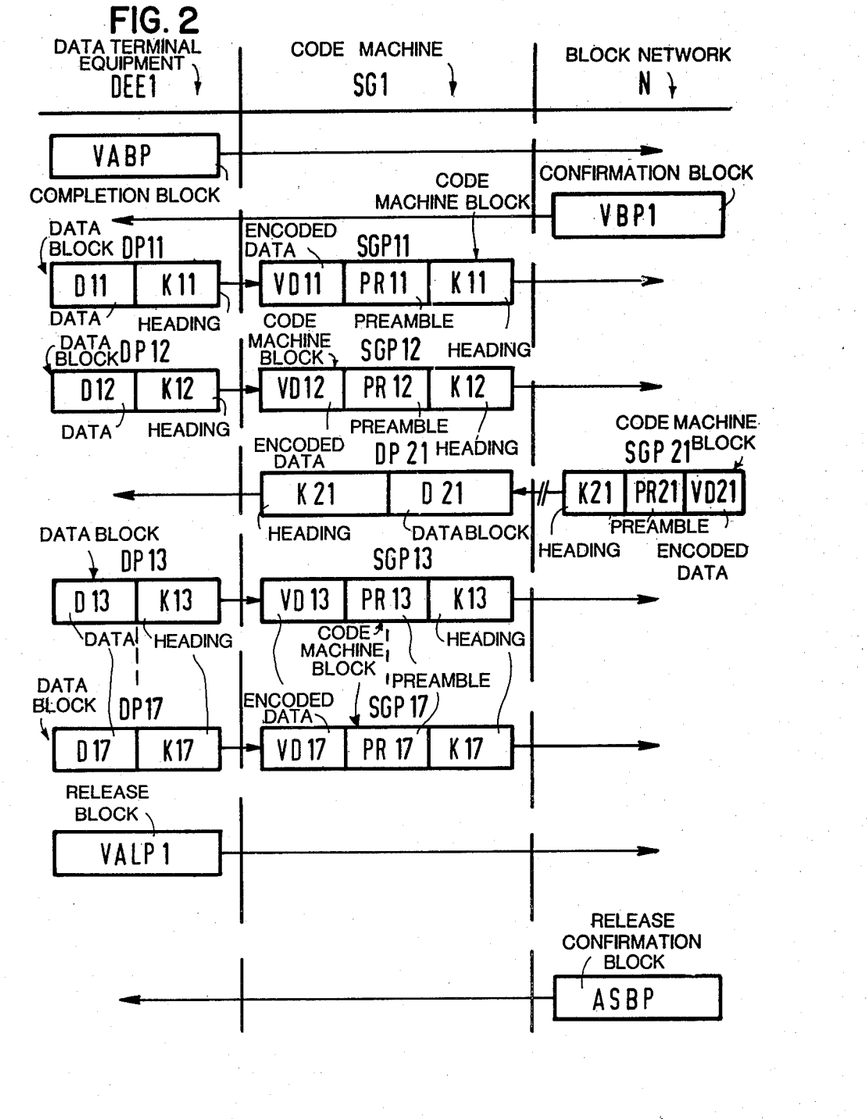
FIG. 2 is a schematic illustration of a known method of synchronization.

FIG. 2 is a diagram illustrating a known synchronization method and is divided into three columns. The first (left-hand) column relates to the data terminal equipment DEE1, the second column relates to the assigned code machine SG1 and the third column relates to the block network N. On the basis of this diagram, a known synchronization method is described in which, for producing connection completion, a connection completion block VABP is transmitted by the data terminal equipment DEE1 and is received in the area of the block network N. The reception of the connection completion block VABP is confirmed with the connection confirmation block VBP1. The data terminal equipment DEE1 then begins with the transmission of the data blocks. First, the data block DP11 with the heading K11 and the data D11 is transmitted. The code machine SG1 receives the heading K11, generates the preamble PR11, encodes the data and causes the transmission of the code machine block SGP11, consisting of the heading K11, the preamble PR11 and the encoded data VD11. Subsequent to the data block DP11, the data terminal equipment DEE1 transmits a data block DP12 with the heading K12 and the data D12. The code machine SG1 causes the transmission of the code machine block SGP12 with the heading K12, the preamble PR12 and the encoded data VD12.

Data blocks of the data terminal equipment DEE2 illustrated in FIG. 1 can also be transmitted between the data blocks of the data terminal equipment DEE1. For example, a data block of the data terminal equipment DEE2, with a heading and with data is supplied to a code machine not illustrated in FIG. 2. This code machine causes the transmission of the code machine block SGP21 with a heading K21, a preamble PR21 and encoded data VD21. The code machine SG1 decodes the data VD21 and transmits the data blocks DP21 with the heading K21 and the decoded data D21 to the data terminal equipment DEE1.

It is now assumed that the data terminal equipment DEE1 transmits further data blocks DP13-DP17 with the respective headings K13-K17 in temporal succession to the code machine SG1. The code machine SG1 respectively transmits code machine blocks SGP13-SGP17 with the headings K13-K17, the preambles PR13-PR17 and the encoded data VD13-VD17, respectively.

After transmission of all data blocks, the data terminal equipment DEE1 transmits a connection release block VALP1 to the code machine SG1 which relays the connection release block VALP1 to the block network N.

The data terminal DEE2 illustrated in FIG. 1 confirms the release with a release confirmation block ASBP. Therefore, the traffic between the two data terminal equipments DEE1 and DEE2 is terminated. The more data blocks are transmitted, all the greater is the plurality of the assigned preambles PR11-PR18 and all the greater is the time which is required for the transmission of these preambles.

Figure 3:
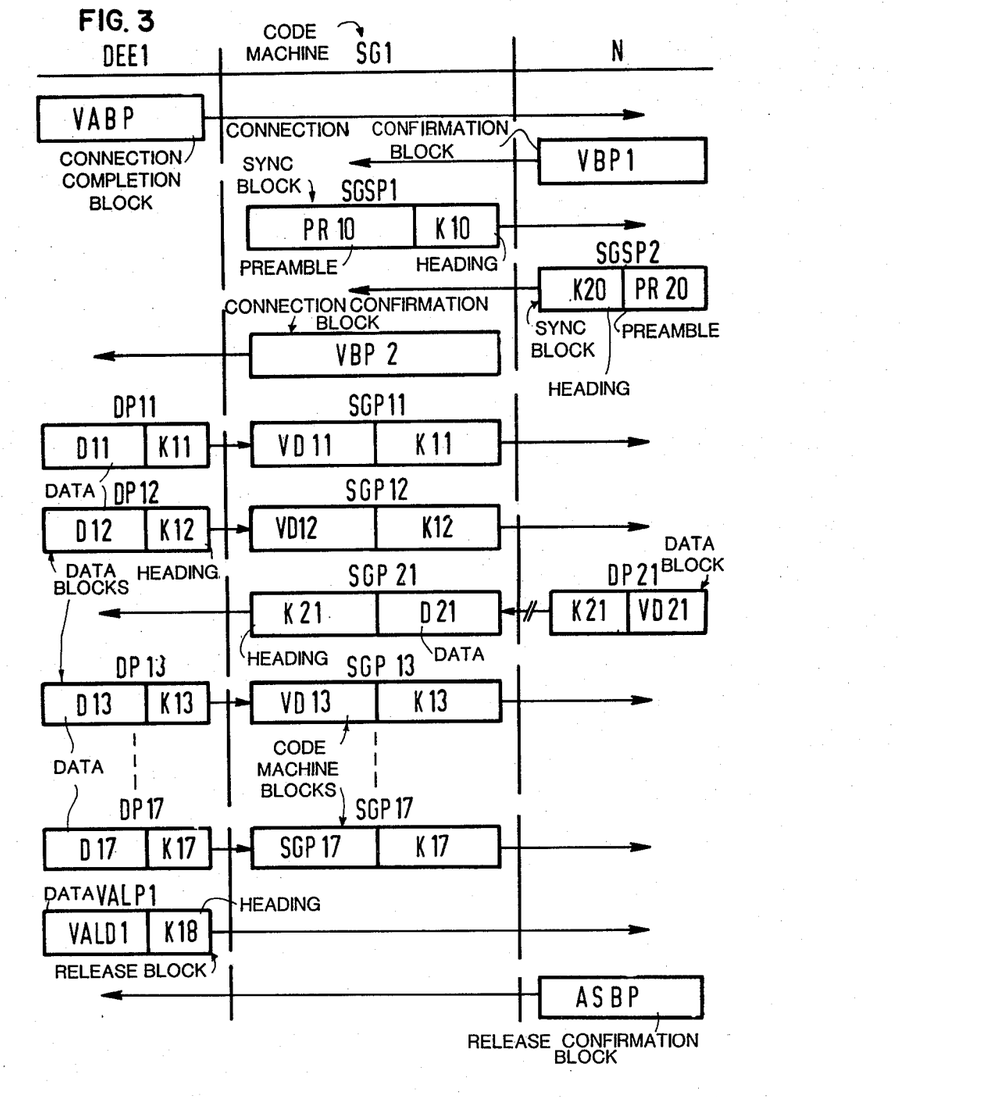
FIG. 3 is a schematic illustration of a method of synchronization proposed by the present invention.

FIG. 3 illustrates a method which, according to the present invention, is distinguished by a rational code machine synchronization. The connection completion block VABP, as in FIG. 2, is supplied to the block network N. As a response thereto, the connection confirmation block VBP1 is transmitted, which is received by the code machine SG1. The code machine SG1 causes the transmission of the code machine sychronization block SGSP1 which effects a synchronization of the transmission portion of the code machine SG1 with the receiving portion of the code machine SG2 during the time interval of the entire completed connection. The code machine synchronization block SGSP1 moreover causes the transmission portion of the code machine SG2 to emit the code machine synchronization block SGSP2 and, therefore, the transmission portion of the code machine SG2 is synchronized with the receiving portion of the code machine SG1. The code machine synchronization blocks SGSP1 and SGSP2 consist of a respective heading K10 and K20, and a respective preamble PR10 and PR20. The preambles contain a respective key, a respective check bit sequence for checking the phasing-in, a respective information for identification of the terminated phasing-in and a respective check word.

The code machine SG1 transmits the connection confirmation block VBP2 to the data terminal equipment DEE1. The connection confirmation blocks VBP1 and VBP2 are identical to one another. Now the data terminal equipment begin with the output of the data blocks; in particular, the data terminal equipment DEE1 transmits the data blocks DP11, DP12 and DP13-DP17. Between data blocks, here between the data blocks DP12 and DP13, the data terminal equipment transmits the data block DP21. The code machine SG1 receives the headings K11, K12 and K13-K17, encodes the data and transmits the code machine blocks SGP11, SGP12 and SGP13-SGP17. In contrast to the method illustrated in FIG. 2, the code machine blocks SGP11, SGP12 and SGP13-SGP17 do not contain preambles. When all data blocks have been transmitted, the data terminal equipment DEE1 transmits the connection release block VALP1 having the heading K18 and the data VALD1. The code machine SG1 recognizes this connection release block, causes the phasing-out, but effects no change of the connection release block. The data terminal DEE2 illustrated in FIG. 1 receives the connection release block VALP1 and confirms the receipt with the release confirmation block ASBP.

The method described above is all the more advantageous the greater the plurality of transmitted data parcels because, given each data parcel, the transmission of the preambles illustrated in FIG. 2 is eliminated.

Figure 4:
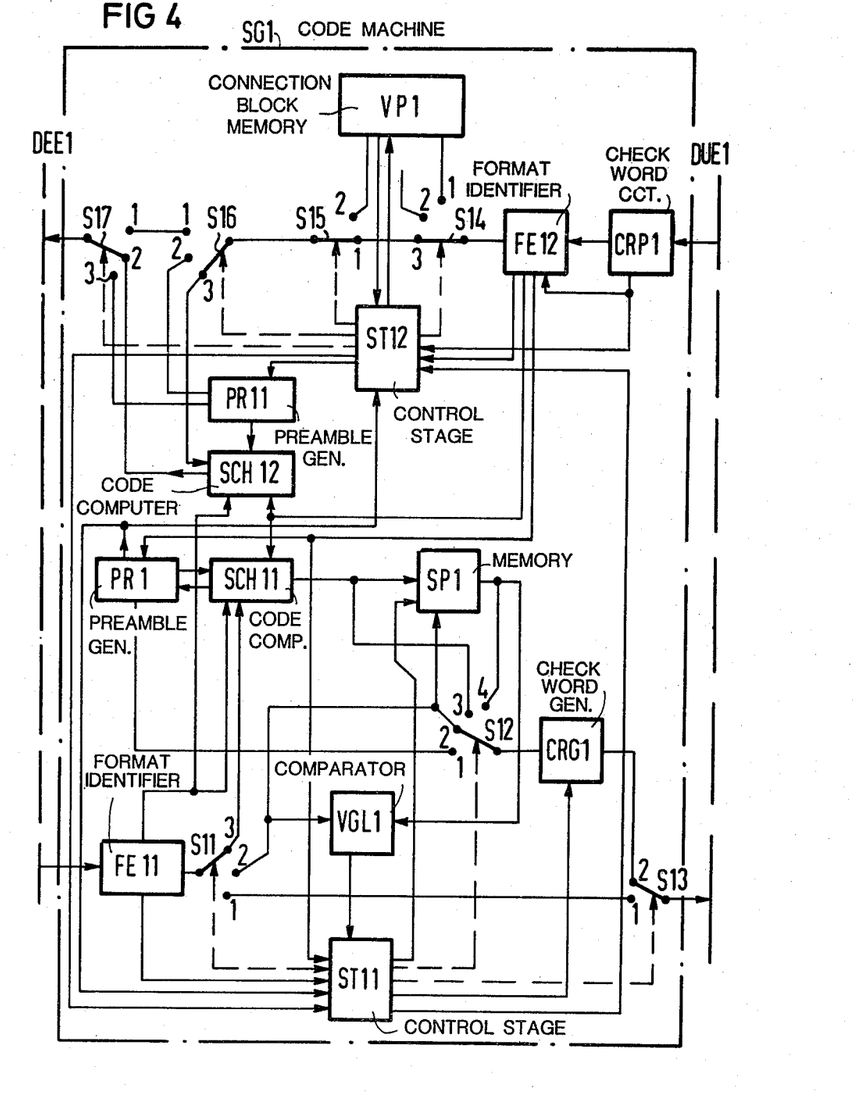
FIG. 4 is a schematic illustration of an embodiment of a code machine of a first station.
Figure 5:
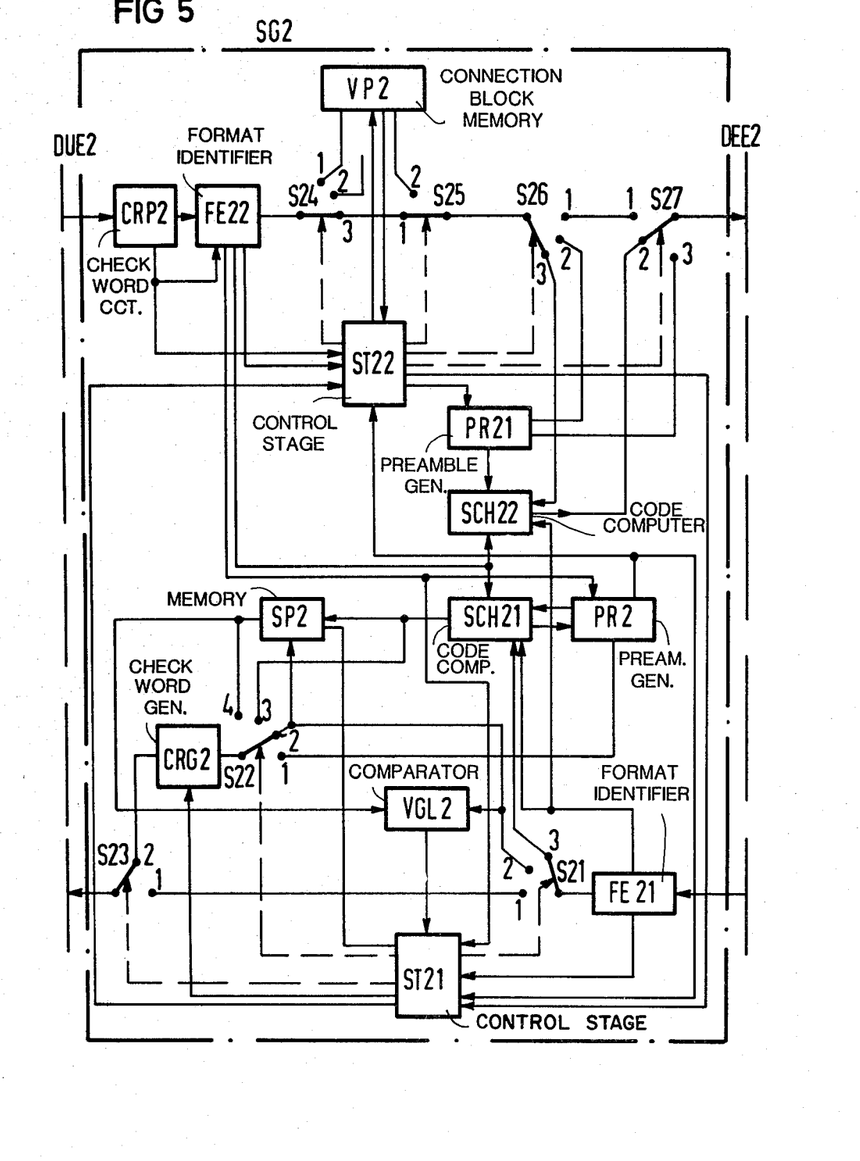
FIG. 5 is a schematic representation of an exemplary embodiment of a code machine of a second station.

FIG. 4 illustrates the code machine SG1 in greater detail, which code machine, as illustrated in FIG. 1, belongs to the data terminal equipment DEE1. FIG. 5 illustrates the code machine SG2 which belongs to the data terminal equipment DEE2. The code machine SG1 is connected, on the one hand, to the data terminal equipment DEE1 and, on the other hand, is connected to the data transmission device DUE1. The code machine SG2 is connected, on the one hand, to the data transmission device DUE2 and, on the other hand, to the data terminal equipment DEE2. The switches S11-S17 of the code machine SG1 and corresponding switches S21-S27 of the code machine SG2 can respectively assume a plurality of switch positions. It is assumed that these switches first take the switch position illustrated with solid lines. With the assistance of a control stage ST12, the switches S14-S17 are set and with the assistance of a control stage ST11, the switches S11-S13 are set. In a similar manner, with the assistance of a control stage ST21 in the code machine SG2, the switches S21-S23 are set and, with the assistance of a control stage ST22, the switches S24-S27 are set.

The format identifiers FE11, FE12 illustrated in FIG. 4 and the format identifiers FE21 and FE22 illustrated in FIG. 5 can recognize the connection completion blocks, the connection confirmation blocks, the preambles, the headings of the data blocks, the connection release blocks, the release confirmation blocks and, potentially, negative acknowledgments.

First, an undisrupted data transmission is presumed. It is therefore assumed that the data terminal equipment DEE1 transmits the connection completion block VABP to the code machine SG1. The format identifier FE11 recognizes this complete connection completion block and causes the control stage ST11 to set the switch positions S11/1 and S13/1. The connection completion block thus passes the code machine SG1 and is fed by way of a check word circuit CRP2 to the format identifier FE22. The connection completion block is not changed by the check word circuit CRP2. The format identifier FE22 likewise recognizes the connection completion block and, with the assistance of the control stage ST22, effects the switch positions S24/3, S25/1, S26/1 and S27/1. In these switch positions, the connection completion block is supplied to the data terminal equipment DEE2. The operations just-described are schematically illustrated in the uppermost line of FIG. 3.

The data terminal equipment DEE2 transmits the connection confirmation block VBP1 by way of the code machine SG2 illustrated in FIG. 5 to the code machine SG1 illustrated in FIG. 4. The format identifier FE21 recognizes the connection confirmation block and, with the assistance of the control stage ST21, effects the switch positions S21/1 and S23/1. The connection confirmation block thus passes the code machine SG2 and arrives by way of a check word check CRP1 and the format identifier FE12 illustrated in FIG. 4. This, with the assistance of the control stage ST12, causes the switch position S14/1. Therefore, the connection confirmation block is stored in a connection block memory VP1. This operation is symbolically illustrated in FIG. 3 in the second line.

With the assistance of the control stage ST11, the control stage ST12 causes the switch positions S12/1 and S13/2. In these switch positions, the code machine synchronization block SGSP1 generated in a preamble generator PR1 in cooperation with a code computer SCH11 is supplied by way of the switch S12, the check word generator CRG1 and the switch S13 to the data transmission device DUE1. By way of the data transmission device DUE2, the code machine synchronization block SGSP1 arrives at the format identifier FE22 which, with the assistance of the control stage ST22, causes the switch positions S24/3, S25/1 and S26/3. In this manner, the preamble PR10 arrives in the code computer SCH22 and sets this code computer. This operation is symbolically illustrated in FIG. 3 in the third line.

The control stage ST22 reports the receipt of a preamble to the control stage ST21. Now, with the assistance of a preamble generator PR2, the code machine synchronization block SGSP2 is generated and supplied to the code computer SCH12 illustrated in FIG. 4. To this end, with the assistance of the control stage ST21, the switch positions are set in such a manner that the code machine synchronization block SGSP2 is fed to the code computer SCH12 by way of the switch position S22/1, the check word generator CRG2, the switch position S23/2, the check word check CRP1, the format identifier FE12, and the switch positions S14/3, S15/1 and S16/3. Thereby, the switch positions were set with the assistance of the control stage ST12, to which the end of the preamble PR10 was reported by the preamble generator PR1. The code computer SCH12 therefore receives the code machine synchronization block SGSP2 and is thus phased-in. This operation is illustrated in the fourth line of FIG. 3.

When the format identifier FE12 recognizes the end of the code machine synchronization block SGSP2, the switch positions S15/2, S16/1 and S17/1 are set with the assistance of the control stage ST12 and the connection confirmation block VBP2 is transmitted from the connection block memory VP1 to the data terminal equipment DEE1. The fifth line of FIG. 3 relates to this operation.

The data terminal equipment DEE1 now begins to transmit the data blocks schematically illustrated in FIG. 3. In particular, the data block DP11 arrives at the format identifier FE11 which recognizes the data block at the heading K11 and, with the assistance of the control stage ST11, effects the switch position S11/2. It is presumed that a number is allocated to each data block and that, possibly, data blocks have already been earlier stored in the memory SP1. Under these pre-conditions, the comparator VGL1 compares the numbers of the data blocks stored in the memory SP1 with the number of the data block DP11. In case this comparison has a negative result, the appertaining data block has been transmitted for the first time and is therefore not yet stored in the memory SP1. Therefore, the comparator VGL1, with the assistance of the control stage ST11, effects the switch positions S11/3 and S12/3 so that the data block DP11 is supplied to the code computer SCH11. In the code computer, the data D11 of the data block DP11 are encoded and the occurring code machine block SGP11 is stored, on the one hand, in the memory SP1 and, on the other hand, is transmitted by way of the switch S12, the check word generator CRG1 and the switch S13 to the data transmission device DUE1. The code machine block SGP11 arrives in the data transmission device DUE2 and the format identifier FE22 which recognizes the heading K11 and, with the assistance of the control stage ST22, effects the switch positions S24/3, S25/1, S26/3 and S27/2. Given these switch positions, the data, with the assistance of the code computer SCH22, are decoded and the decoded data are supplied to the data terminal equipment DEE2 by way of the switch S27. These operations are symbolically illustrated in the sixth line of FIG. 3.

The transmission of further data blocks DP12 and DP13–DP17 schematically illustrated in FIG. 3 is accomplished in the same manner as has just been described on the basis of the data block DP11. The transmission of the data block DP21 likewise occurs in a similar manner, because the code machines SG1 and SG2 illustrated in FIGS. 4 and 5 are constructed completely identically. In order to release the connection, the data terminal equipment DEE1 transmits the connection release block VALP1 to the format identifier FE11. This recognizes the heading of the connection release block and causes, on the one hand, the phasing-out of the code computers SCH11, SCH12 and, on the other hand, the switch positions S11/1 and S13/1. The connection release block thus arrives by way of the data transmission devices into the format identifier FE22 which, on the one hand, causes the phasing-out of the code computers SCH21, SCH22 and, on the other hand, with the assistance of the control stage ST22, causes the switch positions S24/3, S25/1, S26/1 and S27/1 to be effective. Given these switch positions, the connection release block VALP1 arrives at the data terminal equipment DEE2. The next to last line in FIG. 3 relates to this operation.

The data terminal equipment DEE2 transmits the release confirmation block ASBP whose heading is recognized by the format identifier FE21 causing the switch positions S21/1 and S23/1 to be effective. In these switch positions, the release confirmation block arrives in the format identifier FE12 which, with the assistance of the control stage ST12, effects the switch positions S14/3, S15/1, S16/1 and S17/1. In these switch positions, the release confirmation block ASBP arrives in the data terminal equipment DEE1. Therefore, the last line of FIG. 3 has also been explained on the basis of FIGS. 4 and 5.

In the data transmission, individual bits or a number of bits can be transmitted without disruption. For example, the case is conceivable that a connection completion block VABP of the data terminal equipment DEE1 illustrated in FIG. 1 is supplied with an undisrupted heading by way of the code machine SG1 and by way of the data transmission device DUE1 to a node KN and that this node recognizes a partially disrupted connection completion block on the basis of the disrupted check word. Under this condition, the node transmits a negative acknowledgment by way of the data transmission device DUE1 to the code machine SG1, where the format identifier FE12 recognizes the negative acknowledgment and causes the switch positions S14/3, S15/1, S16/1 and S17/1 to be effective. In these switch positions, the negative acknowledgment arrives at the data terminal equipment DEE1 which subsequently repeats the connection completion block.

Moreover, it is conceivable that the connection completion block transmitted by the data terminal equipment DEE1 exhibits a disrupted heading. In this case, the format identifier FE11 illustrated in FIG. 4 does not relay the connection completion block to the data terminal equipment DEE2 because it does not recognize the connection completion block as such. In this case, a further connection completion block must be transmitted by the data terminal equipment DEE1 after termination of a control time.

It is further conceivable that the code machine synchronization block SGSP1, which is generated with the assistance of the preamble generator PR1 illustrated in FIG. 4, is at least partially disrupted. If, for example, only the heading K10 of this block SGSP1 is disrupted, then no reaction is to be expected by the node KN of the block network N. In the control stage ST11 illustrated in FIG. 4, however, the time at which the block SGSP is transmitted is retained. If, after the elapse of a predetermined duration, no acknowledgment arrives at the control stage, then a code machine synchronization block SGSP1 is again transmitted.

However, the case is also conceivable at the check word of the code machine synchronization package SGSP1 is disrupted, in contrast to which the heading K10 is assumed as not being disrupted. When such a block SGSP1 is transmitted by the code machine SG1 illustrated in FIG. 4 and is transmitted, then the check word circuit CRP2 illustrated in FIG. 5 recognizes the disrupted check word and, with the assistance of the control stage ST22, effects the switch position S24/2. Therefore, the relaying of the code machine synchronization block SGSP1 is prevented. After the elapse of a control time, the data terminal equipment DEE1 repeats the connection completion block VABP. It is also possible that the check word circuit CRP2, after recognition of the disruptive check word, causes a transmission of a preamble to the second data terminal equipment DEE2 with the assistance of the control stage ST22 and that this second data terminal equipment DEE2 recognizes the disruptive data with the assistance of the preamble and emits a negative acknowledgment which occasions a repeated transmission of the code machine synchronization block.

The data blocks transmitted by the data terminal equipment DEE1 illustrated in FIG. 1 contain a check word and are supplied to one of the nodes KN of the block network N. In case the check word is disrupted, then the node recognizes this at least partially disrupted data block and responds with a negative acknowledgment. The data terminal equipment DEE1 recognizes the negative acknowledgment and repeats the data block. In this context, it has already been described that the format identifier FE11 illustrated in FIG. 4 recognizes the heading of such a data block and that, with the assistance of the control stage ST11, it causes the switch position S11/2 to be effective. It has likewise already been explained that the comparator VGL1 compares the numbers of the data blocks stored in the memory SP1 with the number of the data block now transmitted and that, given different numbers, the data of the data block are encoded with the assistance of the code computer SCH11 and, in further sequence, are transmitted to the code machine SG2 illustrated in FIG. 5. In case, given these preconditions, the comparator VGL1 identifies the equality of the numbers, then, with the assistance of the control stage ST11, is occasions the switch position S12/4. In this case, therefore, it is a matter of a repeated data block that is already stored in partially encoded form in the memory SP1 and which is relayed to the code machine SG2 from the memory SP1 by way of the switch S12, the check word generator CRG1 and the switch S13.

Finally, the case is also conceivable that the check word of the connection confirmation block VBP1 of the data terminal equipment DEE2 is disrupted. The check word circuit CRP1 illustrated in FIG. 4 recognizes the disrupted check word and, with the assistance of the control stage ST12, causes the switch positions S14/2, S15/2, S16/1 and S17/1 to be effective. In this case, therefore, the partially disrupted connection confirmation block is not stored in the connection block memory VP1 but, rather, is relayed in disrupted form to the data terminal equipment DEE1. This data terminal equipment DEE1 recognizes the disrupted check word and causes a repetition of the connection confirmation block.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of synchronizing first and second code machines which are operated in a packet switching network, in which a set up block is transmitted to set up a connection between a first data terminal equipment and a second data terminal equipment, a connection confirmation block is transmitted between the second data terminal equipment and the first data terminal equipment, and then the data terminal equipments then transmit data blocks to one another, the improvement therein comprising the steps of:

storing the connection confirmation block in the first code machine of the first data terminal equipment;

after receiving the connection confirmation block, transmitting a code machine synchronization block from one code machine to the other to synchronize code computers in the code machines; and after synchronization of the code computers, relaying the connection confirmation block to the first data terminal equipment.

2. The improved method of claim 1, comprising the step of:

forming the code machine synchronization block comprising a heading, a preamble including a key and an information for characterizing the terminated phase-in, a check bit sequence for checking the phasing-in, and information for the identification of the terminated phasing-out.

3. The improved method of claim 1, and further defined by the steps of:

transmitting a first synchronization block from the first code machine to the second code machine to synchronize their respective transmitting and receiving portions; and then transmitting a second synchronization block from the second code machine to the first code machine to synchronize the respective transmitting and receiving portions.

4. The improved method of claim 3, and further defined by:

relaying the connection confirmation block to the first data terminal equipment after receiving the second code machine synchronization block.

* * * * *